B. C. WHITE.
COTTON PICKER.
APPLICATION FILED OCT. 26, 1910.
1,008,229.
Patented Nov. 7, 1911.
2 SHEETS—SHEET 1.
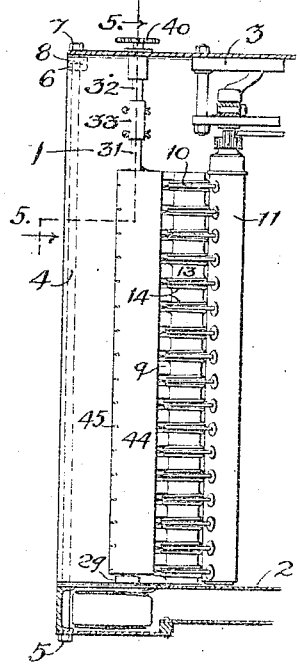
Fig. 1.
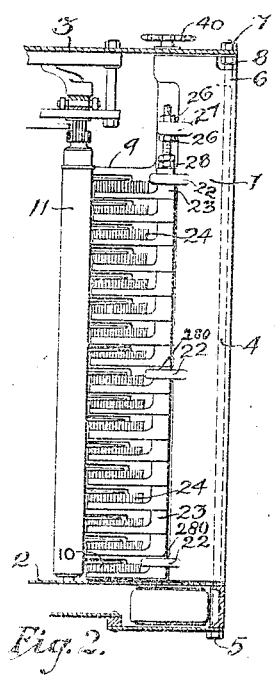
Fig. 2.
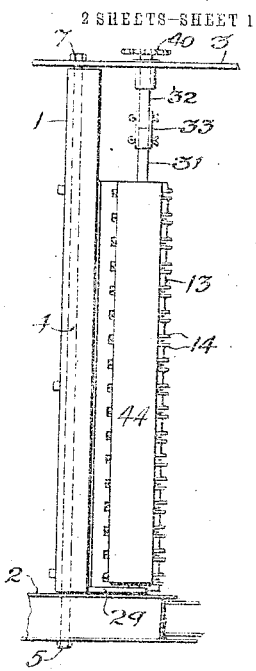
Fig. 3.
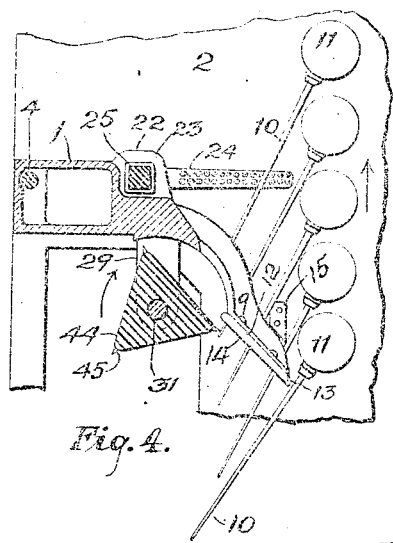
Fig. 4.
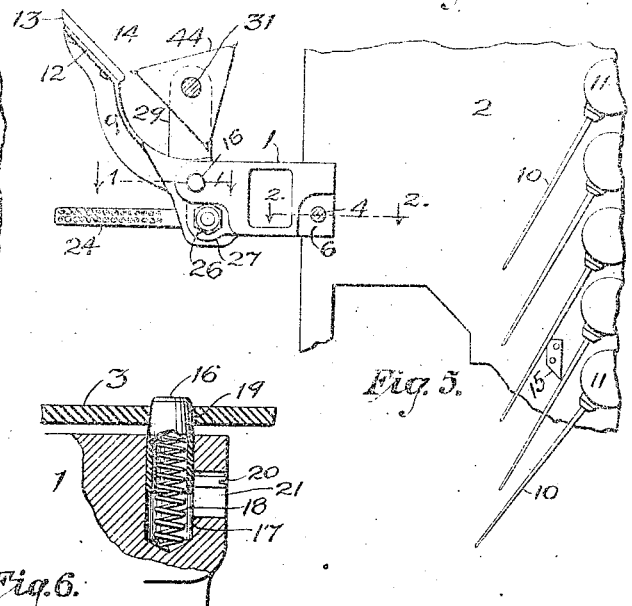
Fig. 5.
Fig. 6.
WITNESSES:
F. E. Nares
G. Blake
INVENTOR.
Bruce Clark White.
BY
Edward S. Beck
ATTORNEY.

B. C. WHITE.
COTTON PICKER.
APPLICATION FILED OCT. 26, 1910.
1,008,229.
Patented Nov. 7, 1911.
2 SHEETS—SHEET 2.
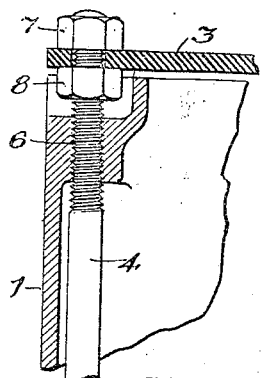
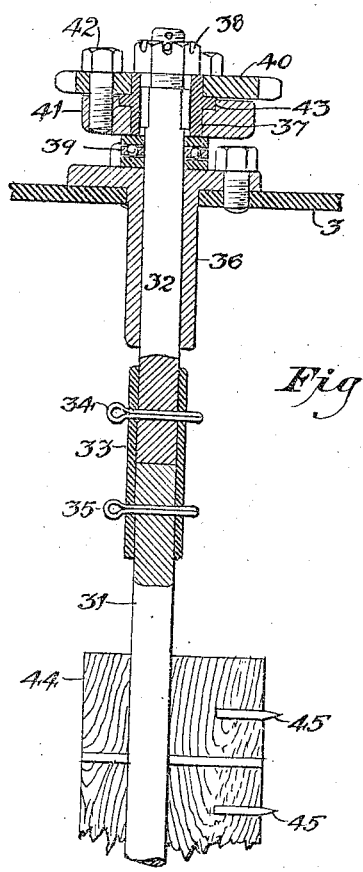
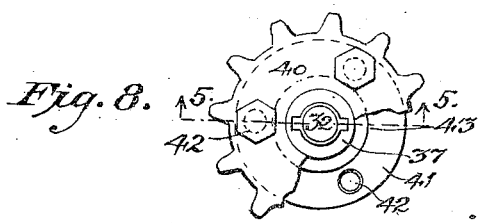
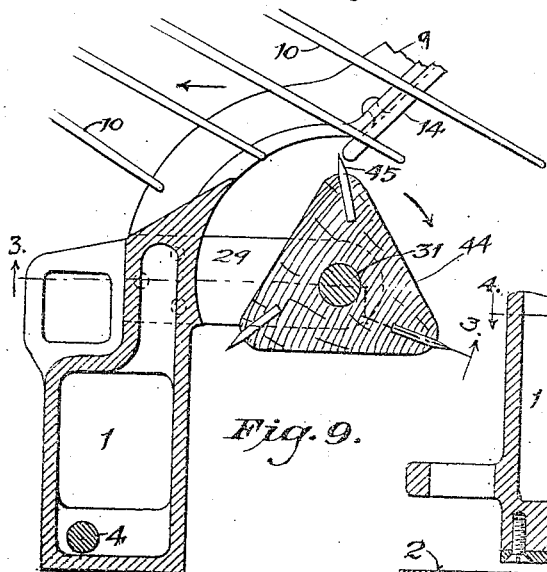
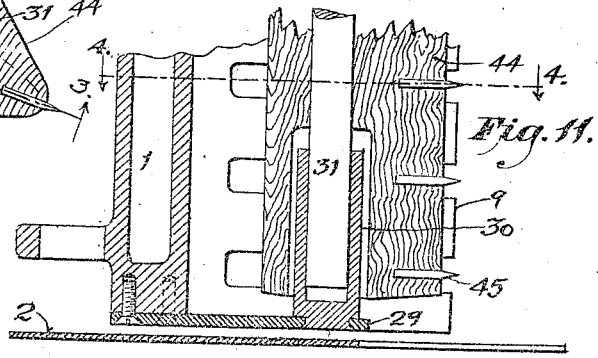
WITNESSES:
INVENTOR.
Bruce Clark White.
BY
ATTORNEY.

UNITED STATES PATENT OFFICE.

BRUCE CLARK WHITE, OF WOONSOCKET, RHODE ISLAND, ASSIGNOR TO PRICE-CAMPBELL COTTON PICKER CORPORATION, OF WILMINGTON, DELAWARE, A CORPORATION OF DELAWARE.

COTTON-PICKER.

1,008,229.  Specification of Letters Patent.  Patented Nov. 7, 1911.

Application filed October 26, 1910. Serial No. 589,244.

*To all whom it may concern:*

Be it known that I, BRUCE CLARK WHITE, citizen of the United States, residing at Woonsocket, in the county of Providence and State of Rhode Island, have invented certain new and useful Improvements in Cotton-Pickers, of which the following is a specification, reference being had therein to the accompanying drawings.

My invention relates to that type of cotton pickers shown in my application Serial No. 472,908, filed January 18, 1908. In this type of machine, picking fingers are thrust longitudinally into the cotton plants while the latter are confined in a longitudinal passage between the picking mechanisms and are revolved therein. The picking mechanisms are hung in the framework of the machine, which straddles the row of cotton plants and is mounted on wheels which traverse the spaces between the rows of plants. The picking fingers are carried in series upon spaced carriers linked together and driven by gearing to cause the fingers to move rearward at a speed equal to the advance of the machine when the fingers are in the plants. The fingers are withdrawn from the plants at the rearward end of their travel, and are swung about and drawn obliquely between stripping edges to relieve them of the cotton wound upon them. This stripping action occurs during the forward travel of the fingers. Immediately beyond the strippers are located brushes for cleaning the fingers of sap. Located opposite to the end of the stripping edges is a doffer or vertical spiked roller for removing cotton or cotton seeds adhering to the stripper.

Experience has demonstrated that the stripper, the spiked roller and the brushes must frequently be removed to give access to their parts and to remove accumulations therefrom.

One object of my invention is to so mount and connect these parts in the drum inclosure that they may be removed or replaced quickly and conveniently.

Another object of my invention is to so form the spiked roller that it will materially assist in keeping that part of the drum inclosure free from accumulations of cotton and cotton seed by acting as a fan.

Other objects of my invention are to provide convenient means for adjusting the height of the stripper bar as a whole and to adjust the height of the brushes thereon.

I accomplish these objects by the devices and combination of parts shown in the drawings and hereinafter more fully described and claimed.

In the accompanying drawings, illustrating the principle of my invention and the best mode now known to me of applying that principle, Figure 1 is a transverse section of the drum, showing the stripper and spiked roller in elevation, looking forward. Fig. 2 is a transverse section of the drum, showing the brushes and stripper column in elevation, looking rearward. Fig. 3 is a side elevation. Fig. 4 is a detail plan view, partly in section, of the stripper, spiked roller and brush in their working position. Fig. 5 is a detail plan view of the same parts as they would appear when swung out of the drum, the top plate being removed. Fig. 6 is a detail section, on line 1—1 of Fig. 5, showing locking pin. Fig. 7 is a detail section, on line 2—2 of Fig. 5, showing hinge rod. Fig. 8 is a top-plan view of a sprocket for driving a fan-acting spike-roller. Fig. 9 is in the main a cross-section, at line 4—4 of Fig. 11, and illustrates particularly the relation of the fan-acting, spiked roller in relation to the stripper. Fig. 10 is a vertical section at a line corresponding to line 5—5 of Figs. 1 and 8, and particularly illustrates the spiked roller construction. Fig. 11 is a section at line 3—3 of Fig. 9, and illustrates the construction of the lower portion of the spike-roller construction and arrangement.

Referring to the several figures of the drawings, in which like characters of reference indicate like parts, 1 is a stripper column extending vertically between the drum floor 2 and the drum top-plate 3 and secured thereto by the hinge-rod 4. This rod extends from bottom to top of the drum and is provided with a head 5 under the drum base, and is threaded at its upper end for threaded engagement with the upper part of the stripper column 1 at 6. The hinge rod is prevented from turning or moving up or down by the nuts 7 and 8 which clamp it to the top plate 3 of the drum. The column 1 is free to turn upon the hinge rod, and is supported at the desired height upon it by the threaded engagement at 6 (Fig. 7).

To adjust the vertical position of the stripper column 1, the top nut 7 is first loosened, leaving the hinge rod 4 free to be turned by its head 5, whereby the column 1 will be screwed up or down by reason of its threaded engagement at 6 with said rod. By tightening nut 7 the rod 4 is secured in its adjusted position. The column 1 remains free to turn upon hinge rod 4 at the adjusted height. The rod 4 acts also as a tie between the drum plates 2 and 3.

Curved projections or stripper fingers 9, 9, preferably made integral with the stripper column 1, project into the path of the picker fingers 10, 10, and extend as near to the path of the carriers 11, 11 as practical. These curved projections 9, 9 terminate in oblique faces 12, 12, which are preferably faced with separable plates 13, 13, riveted thereto. Projecting lips 14, 14 along their edges form strippers for the cotton wound upon the fingers 10, 10. The plates 13, 13 are nearly as wide as the space between two adjacent picking fingers, and are tapered to match the taper of the picking fingers. They are spaced to register accurately with the vertical spacing of the picking fingers, and their edges are in close relation to said fingers on opposite sides of each, whereby they will strip and remove cotton wound upon them, from heel to point.

A stop block 15, secured to the floor plate 2 of the drum, limits the inward swing of the stripper 1. A locking pin 16 fitted to slide freely in a hole 17 in the top end of the stripper-column 1, and sustained therein by a spring 18, provides a locking device for the stripper column. Said locking pin 16 is thrust upward by its spring into a hole 19 in the top plate 3 of the drum, when the column is swung to its innermost position and in contact with the block 15. The upper end of the pin 16 is preferably made tapering to fit a correspondingly tapered hole 19. By depressing the pin 16 the stripper may be swung outwardly to the position shown in Fig. 5. In swinging the stripper back to place, pin 16 must be pushed down to pass under plate 3. When the stripper has been swung inwardly to meet the stop 15, the pin 16 can be forced upward into the tapered hole 19 in the plate 3, thus locking the column and its attached parts in their operative position. A dowel pin 20, secured in the locking pin 16 and free to slide in the slot 21, prevents pin 16 from being pushed out of the hole 17 in the column.

At the back of the column 1 are lugs 22, 22, having square apertures therethrough in which are freely fitted the squared hubs 23, 23 of certain of the finger brushes 24. The hubs 23 are square-apertured to fit upon the square brush bar 25, whereby the brushes are prevented from turning about the brush bar. The upper end of the brush bar is screw-threaded and provided with adjusting nuts 26, 26 above and below the lug 27 formed on the stripper column 1, whereby the brushes may be adjusted vertically in relation to the picking fingers. The brushes are secured endwise upon the brush bar by the nuts 28, 28. There are three lugs 22,—a top lug, a bottom lug and an intermediate lug. The hubs 23 of the brushes are arranged in two groups, as shown in Fig. 2, one group being between the intermediate lug 22 and the upper lug 22, and the other group being below the intermediate lug 22 and between that lug and the bottom lug 22. All the hubs 23 fit tightly on the square brush-bar 25, and move when that brush-bar is moved. Spaces, indicated at 280 in Fig. 2, are left for the slight adjustment of the brushes that is desirable. In Fig. 2 the brushes are shown in their higher position. By adjustment downward of the brush-bar, the brushes may be moved slightly downward from the position in which they are shown.

Secured to the bottom of the stripper column 1 is a projecting bracket 29, upon the end of which is mounted a bearing 30 (Fig. 11). In this bearing is journaled a vertical shaft 31. A shaft 32 is connected to shaft 31 by coupling sleeve 33, pinned to both shafts by removable pins 34 and 35. By withdrawing these pins the coupling may be slid downward on shaft 31, permitting the latter to be swung laterally with the column 1.

A flanged sleeve 36, secured to the top plate 3, forms a journal bearing for the shaft 32. Keyed to the upper end of shaft 32 is a flanged bushing 37 free to slide endwise thereon. An adjusting nut 38 screwed onto the upper end of shaft 32 is adapted to raise or lower the said shaft, and with it, through the coupling sleeve 33, the shaft 31. Bushing 37 is supported by flanged sleeve 36, between which I preferably introduce a thrust collar 39 to carry the weight of the attached parts. A sprocket 40 is driven by a chain from the vertical shaft of the picker mechanism, not shown. This sprocket is bolted to a clamping ring 41 by bolts 42. The sprocket and clamping ring clamp upon a flange 43 of the bushing 37 at any desired position, the purpose of which will appear hereinafter.

Mounted upon the shaft 31 is a doffer 44 having small projecting spikes 45 spaced to register with the openings in the stripper. This roller is flat-sided, preferably approximating an equilateral triangle in cross section, as shown in Figs. 4 and 5. The spikes are placed in rows at the corners. The effect of this flat-sided roller at a high speed is that of a centrifugal fan, whereby the strong current of air produced by the picking fingers in their rapid motion toward the stripper is counteracted and reversed, thus aiding materially in keeping the space about the stripper and spiked roller free of accumulation of cotton. This fan-like doffer or roller does not in practice become entangled and wound about with cotton, by reason of its form and the centrifugal air current produced by its rotation.

The points of the spikes 45 (Fig. 9) are arranged to pass slightly within the path of the ends of the picking fingers 10 to effectively clear the end of the stripper space and to prevent cotton and cotton-seeds from being carried beyond the stripper by the fingers. The proportions of the sprockets driving the spiked-roller are such that a spike passes the stripper for each succeeding passage of a finger, whereby they may be accurately timed to cross the path of the finger in the same plane without interference. To effect this angular adjustment of the spiked-roller, the clamping 41 may be loosened, the roller 44 may be turned to its desired position, and the sprocket 40 may then be securely clamped to the flanged bushing 37. The spiked roller 44 and the brushes 24 being mounted in the stripper column will swing out with it, and it will be necessary first to detach the coupling 33.

My improvements may be embodied in other forms without departure from my invention.

What I claim is:—

1. In a cotton-picking machine, the combination of picking fingers and mechanism to hold them spaced apart in vertical rows with a vertical stripper column provided with laterally projecting strippers arranged in a vertical row and spaced apart to register with the spaces between the picker fingers, the strippers being oblique to the vertical stripper column and located to strip the cotton from heel to point of the fingers; said stripper column being hinged vertically in a picker drum and mounted to swing outwardly; the picker drum; a stop to limit the inward movement of the stripper column, and means to lock it in its inward position to the drum.

2. The combination, in a cotton-picking machine, of a finger-containing drum with a stripper column; a vertical hinge-rod therefor mounted in the upper and lower portions of the drum and having a threaded connection with the stripper column; and means for clamping the hinge-rod to the drum to prevent the rod from turning and from moving up and down.

3. In a cotton-picking machine, the combination with a picking finger-containing drum of a vertically hinged stripper column having stripping fingers projecting into spaces between the picking fingers; the picking fingers, and mechanism to hold and operate them; a vertical series of finger brushes carried by the stripper column and projecting into spaces between the picking fingers; a vertical fan-doffer carried by the stripper column and having vertical rows of spikes; the stripper column being mounted to swing outwardly upon its vertical hinge; a block within the drum to limit the inward movement of the stripper column; means for locking the stripper column in fixed relation to the drum, and means for rotating the fan-doffer; the brushes being at one side and the fan-doffer at the other side of the stripper fingers.

4. The combination, in a cotton-picking machine, of a plurality of vertical series of cotton-picking fingers spaced vertically apart, and mechanism to hold and operate said fingers, with a series of strippers arranged in a vertical row and spaced apart to register with the spaces between the picking fingers; means for holding the free end portions of the stripper fingers stationary and cross-wise of the picker fingers in their movements between the stripper fingers to cause the stripper fingers to strip the picking fingers from heel to point; a vertical doffer having a solid polygonal body the faces whereof operate as fans, and also having a plurality of vertical rows of spikes that pass slightly within the path of the ends of the picking fingers; and means to rotate the fan-doffer to move its vertical rows of spikes downwardly along and away from the longitudinal axes of the picker fingers.

5. The combination, in a cotton-picking machine, of a picker finger-containing drum with a vertical doffer mounted upon a vertical endwise removable shaft; a second shaft carrying a sprocket wheel, and a removable coupling for said shafts.

6. In a cotton picker, the combination of traveling picker fingers; a pivotally mounted swinging stripper column; stripping means projecting from said column; finger brushes mounted on said column, and a spiked roller also mounted on said column; the stripping means being intermediate the finger brushes and spiked roller and adapted to project into spaces between adjacent picker fingers.

7. In a cotton-picking machine, the combination of traveling picker fingers; stripping edges mounted stationary to enter spaces between adjacent picker fingers in their movement; and a vertical, rotatable doffer having a polygonal fan-acting body portion and projections acting upon ends of the stripping edges.

8. In a cotton picker, the combination of traveling gathering fingers; stripping edges in the path of said fingers between which they are drawn in the operation of the machine; and a revoluble doffer having points projecting into the spaces between the outer ends of said stripping edges and alternating with the finger ends in their occupation of said space; and means for adjusting the angular position of said projecting points in relation to the progress of said fingers whereby they may pass each other at the desired point without interference.

9. In a cotton picker, the combination of cotton picking fingers with a doffer polygonal in cross-section and provided at its corners with projecting spikes spaced apart; and means for holding the polygonal spiked doffer in a position to bring the spikes into working relation with the free end portions of the fingers and to cause the surfaces of the doffer between the spikes to act as a fan for blowing cotton doffed from the fingers away from the same.

In testimony whereof I have affixed my signature in presence of two witnesses.

BRUCE CLARK WHITE.

Witnesses:
  EDWARD S. BEACH,
  F. E. NARES.